US012810652B2

(12) United States Patent
Takeuchi et al.

(10) Patent No.: US 12,810,652 B2
(45) Date of Patent: Nov. 24, 2026

(54) METHOD FOR RECOGNIZING BEHAVIOR

(71) Applicant: TOYOTA JIDOSHA KABUSHIKI KAISHA, Toyota (JP)

(72) Inventors: Shinichi Takeuchi, Nisshin (JP); Tomoki Kuramochi, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 251 days.

(21) Appl. No.: 18/736,817

(22) Filed: Jun. 7, 2024

(65) Prior Publication Data

US 2024/0412561 A1 Dec. 12, 2024

(30) Foreign Application Priority Data

Jun. 9, 2023 (JP) ................................ 2023-095607

(51) Int. Cl.
*G06V 40/00* (2022.01)
*G06T 7/20* (2017.01)
(Continued)

(52) U.S. Cl.
CPC ................ *G06V 40/20* (2022.01); *G06T 7/20* (2013.01); *G06T 7/70* (2017.01); *G06T 2207/10016* (2013.01); *G06T 2207/30196* (2013.01)

(58) Field of Classification Search
CPC ...... G06V 40/20; G06V 20/52; G06V 40/103; G06V 40/23; G06V 40/25; G06T 7/20;
(Continued)

(56) References Cited

U.S. PATENT DOCUMENTS

2021/0398297 A1* 12/2021 Saito ....................... G06T 7/251
2022/0292694 A1* 9/2022 Tonouchi ................ G06T 7/251
2023/0252784 A1* 8/2023 Ahmed .................. G06V 40/10
382/103

FOREIGN PATENT DOCUMENTS

JP 2022-003434 A 1/2022

OTHER PUBLICATIONS

Kawabata et al., "Research and Development of a Multi-Person Boarding and Alighting Action Recognition System Addressing In-Vehicle and External Safety in Last-Mile Autonomous Driving", The Institute of Electronics, Information and Communication Engineers (IEICE) Technical Report, IE2018-80-IE2018-106, Image Engineering [online], vol. 118, No. 450, Feb. 12, 2019, 5 pages (with English abstract).

(Continued)

*Primary Examiner* — Xiao Liu
(74) *Attorney, Agent, or Firm* — Oblon, McClelland, Maier & Neustadt, L.L.P.

(57) ABSTRACT

In a method for recognizing behavior, a computer obtains skeleton information of a worker in time series from video data. The computer obtains position coordinates of each part of the worker included in the obtained skeleton information. When the skeleton information of more than one worker is obtained, the computer identifies a worker subject to behavior recognition based on the position coordinates of each worker. The computer recognizes behavior of the identified worker based on the time series of the skeleton information of the identified worker. In the behavior recognition method, the behavior of a worker may be recognized by using a learned model learned in advance by machine learning.

4 Claims, 3 Drawing Sheets

(51) Int. Cl.
*G06T 7/70* (2017.01)
*G06V 40/20* (2022.01)

(58) Field of Classification Search
CPC ............. G06T 7/70; G06T 2207/10016; G06T 2207/30196
See application file for complete search history.

(56) References Cited

OTHER PUBLICATIONS

Hirano, et al., “AI Technologies and Image/Video Analysis: Video AI Solutions for Achieving Labor Saving and Automation in Manufacturing Sites”, Monthly JETI, Japan Publication & Production Center Co., Ltd., vol. 70, No. 1, Jan. 15, 2022, 6 pages.

Japanese Office Action issued Dec. 23, 2025 in Japanese Patent Application No. 2023-095607 (with partial unedited computer-generated English translation), 7 pages.

* cited by examiner

METHOD FOR RECOGNIZING BEHAVIOR

CROSS-REFERENCE TO RELATED APPLICATIONS

This application is based upon and claims the benefit of priority from prior Japanese Patent Application No. 2023-095607, filed on Jun. 9, 2023, the entire contents of which are incorporated herein by reference.

BACKGROUND

1. Field

The following description relates to a method for recognizing behavior.

2. Description of Related Art

Japanese Laid-Open Patent Publication No. 2022-003434 discloses a behavior recognition system including a behavior recognition device and a camera. The behavior recognition device obtains video data from the camera. Further, the behavior recognition device obtains skeleton information of a worker in time series from the video data. The behavior recognition device recognizes the behavior of a worker from the time series of the obtained skeleton information.

In such a behavior recognition system, more than one worker may be shown in the video data obtained from the camera. In this case, the behavior recognition device may obtain skeleton information of more than one worker. However, the above behavior recognition device does not consider such a situation in which the skeleton information of more than one worker is obtained. Thus, the behavior of a worker subject to the behavior recognition may not be recognized as intended.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for recognizing behavior used in control executed by a computer is provided. The method includes obtaining a time series of skeleton information of a worker from video data; obtaining position coordinates of each part of the worker included in the obtained skeleton information; identifying, when the skeleton information of more than one worker is obtained, a worker who is subject to behavior recognition based on the position coordinates of each of the more than one worker; and recognizing behavior of the identified worker based on the time series of the skeleton information of the identified worker.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Schematic Configuration of Behavior Recognition System

One embodiment of the present invention will now be described with reference to FIGS. 1 to 3. First, a schematic configuration of a behavior recognition system 10 will be described.

Figure 1:
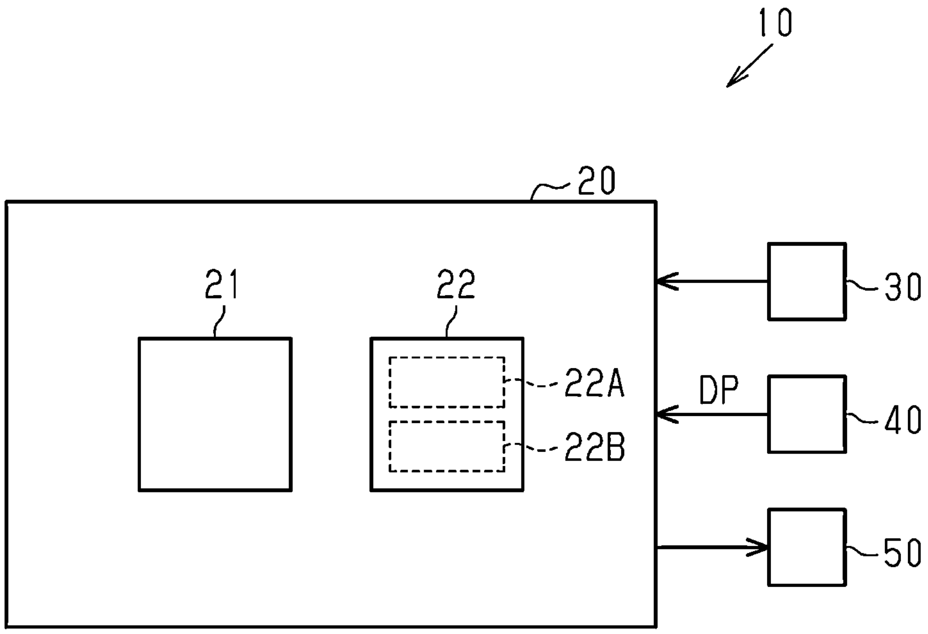
FIG. 1 is a schematic diagram of a behavior recognition system.

As shown in FIG. 1, the behavior recognition system 10 includes a computer 20, an input device 30, a camera 40, and a display 50.

The input device 30 includes, for example, a keyboard and a pointing device. The camera 40 detects video data DP which is a video of a subject. In the present embodiment, the camera 40 is arranged in the vicinity of a location where a worker subject to behavior recognition is working. In addition, the camera 40 is positioned at a place where the camera 40 can capture the state of the worker who is subject to the behavior recognition from the front of the worker. Furthermore, the camera 40 is directed toward the location where the worker, who is subject to behavior recognition, is working. An example of a worker subject to the behavior recognition is a technician who assembles components of an automobile. The display 50 is configured to show various types of information.

The computer 20 includes an execution device 21 and a memory device 22. An example of the execution device 21 is a central processing unit (CPU). The memory device 22 includes a read-only memory (ROM), which can only be read, a volatile random-access memory (RAM), which can be read and written, and a non-volatile storage, which can be read and written. The memory device 22 stores various types of programs and various types of data in advance. Further, the memory device 22 stores a behavior recognition program 22A in advance as one type of the various programs. Furthermore, the memory device 22 stores mapping data 22B as one type of the various data. The mapping data 22B is described in a format that allows for the execution device 21 to perform mapping that is a relationship between a predetermined input variable and an output variable indicating the behavior of a worker. The mapping described in the mapping data 22B is learned in advance by machine learning. The mapping data 22B will be described in detail later. The execution device 21 implements various processes in a method for recognizing behavior by executing the behavior recognition program 22A stored in the memory device 22. An example of the computer 20 is a personal computer.

The computer 20 obtains signals from the input device 30 and the camera 40. In other words, the computer 20 obtains video data DP from the camera 40. In this case, the execution device 21 stores the video data DP in the memory device 22. Further, the computer 20 shows various types of information on the display 50 by outputting control signals to the display 50.

Recognition Control

A recognition control executed by the computer 20 will now be described with reference to FIG. 2. The recognition control is for recognizing the behavior of a worker who is subject to behavior recognition. In the present embodiment, the computer 20 executes the recognition control in predetermined control cycle.

Figure 2:
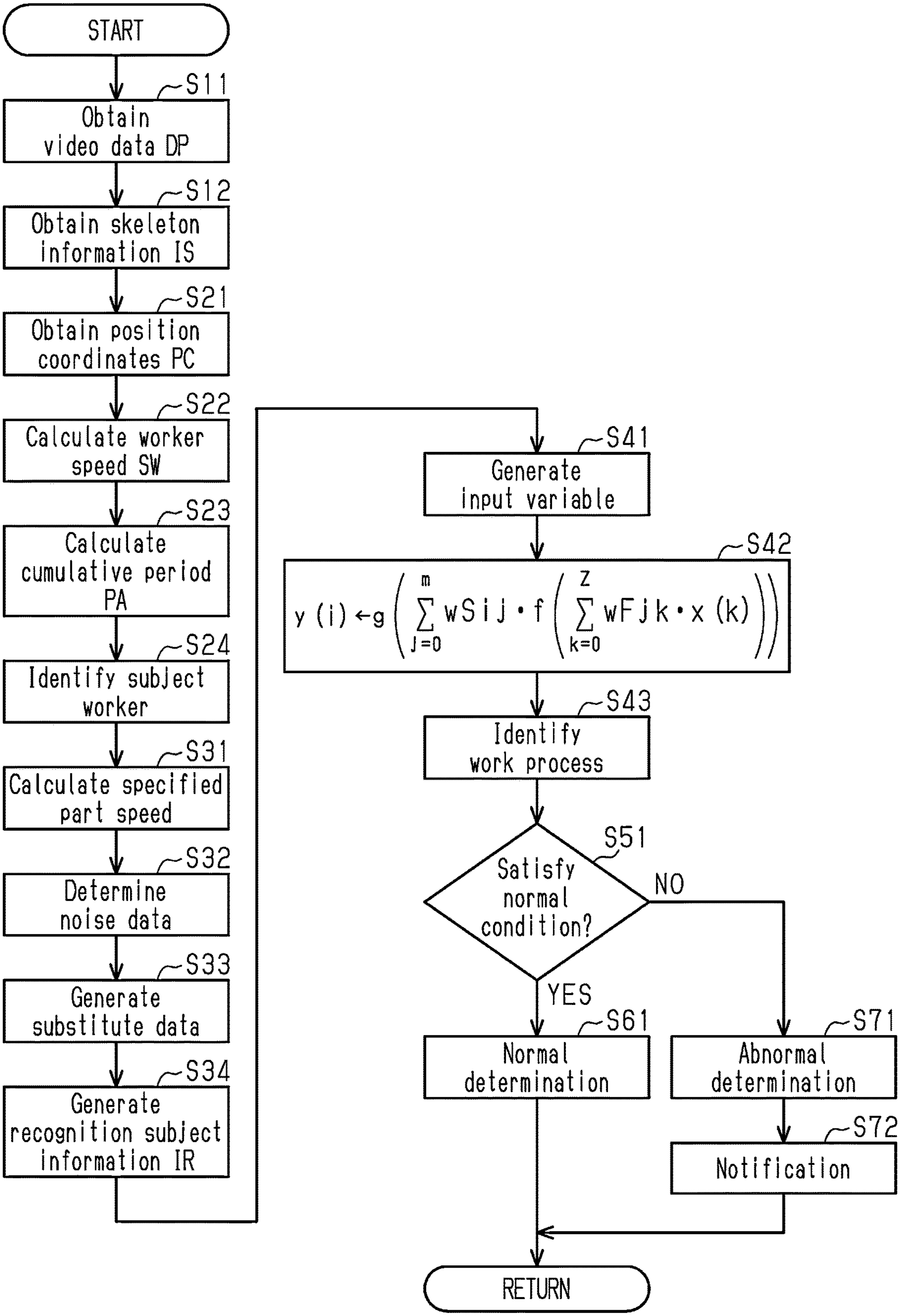
FIG. 2 is a flowchart illustrating a recognition control.
Figure 3:
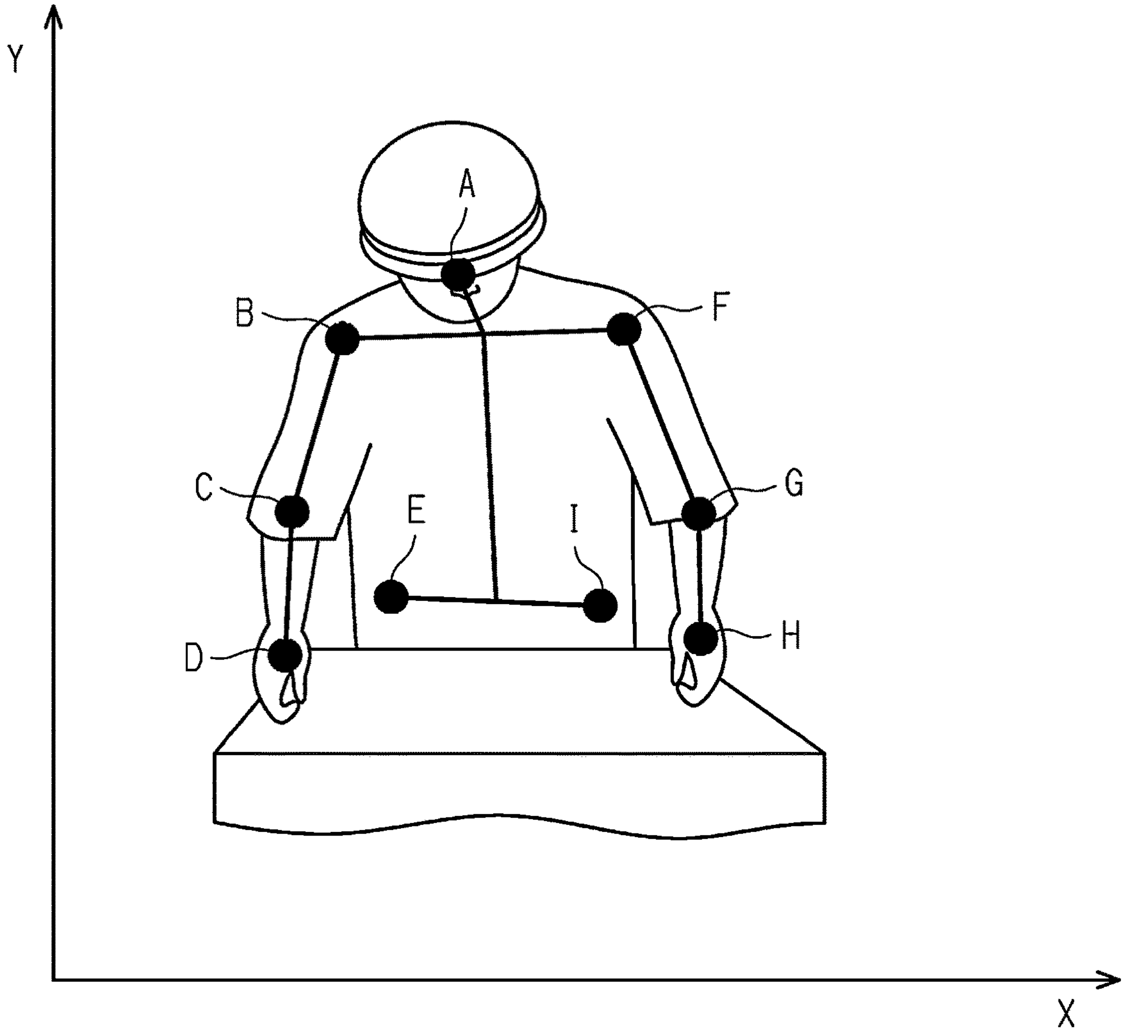
FIG. 3 is a diagram illustrating skeleton information of a worker.

As shown in FIG. 2, when the execution device 21 of the computer 20 starts the recognition control, the execution device 21 performs step S11. In step S11, the execution device 21 obtains, from the memory device 22, the video data DP for a predetermined specific period PR from a time point at which step S11 is performed. An example of the specific period PR is several seconds to several tens of seconds. After step S11, the execution device 21 proceeds to step S12.

In step S12, the execution device 21 obtains skeleton information IS of a worker included in the video data DP in time series from the video data DP for the specific period PR. Specifically, the execution device 21 obtains a plurality of frames included in the video data DP for the specific period PR. Then, the execution device 21 obtains the skeleton information IS of the worker included in each frame by performing a process called "skeleton detection" or the like. In this case, the execution device 21 obtains the skeleton information IS of each worker included in the frame. As the process for obtaining the skeleton information IS, for example, the techniques described in Japanese Laid-Open Patent Publication Nos. 2022-003434 and 2019-071008 may be used. After step S12, the execution device 21 proceeds to step S21.

In step S21, the execution device 21 obtains position coordinates PC of a part included in the skeleton information IS for the time series of the skeleton information IS of a worker, that is, for the skeleton information IS included in the multiple frames. As shown in FIG. 3, the parts of the worker included in the skeleton information IS are the head A, right shoulder B, right elbow C, right hand D, right hip E, left shoulder F, left elbow G, left hand H, and left hip I, that is, nine parts in total. The position coordinates PC are expressed by an orthogonal coordinate system of an X-axis and a Y-axis. In the present embodiment, the X-axis is an axis line orthogonal to the perpendicular direction. The Y-axis is an axis extending in the perpendicular direction. The execution device 21 obtains the position coordinates PC of the part included in the skeleton information IS of each worker. After step S21, the execution device 21 proceeds to step S22 as shown in FIG. 2.

As shown in FIG. 2, in step S22, the execution device 21 calculates a worker speed SW, which is a moving speed of the worker corresponding to the position coordinates PC, based on the time series of the position coordinates PC. For example, the execution device 21 calculates the worker speed SW based on the absolute value of a variation amount per unit time of a value indicating the position on the X-axis of the position coordinates PC corresponding to the head A. It is assumed that a total of N sets of time series of the skeleton information IS of a certain worker are acquired in step S12. The "N" is an integer greater than or equal to two. Also, the N data sets are referred to as the data at the first time point, the data at the second time point, . . . , and the data at the N-th time point in order from the oldest data. In this case, in step S22, the execution device 21 calculates the absolute value of a differences between the values indicating the positions on the X-axis of the position coordinates PC corresponding to the head A at the first time point and the second time point as the absolute value of the variation amount per unit time at the first time point and the second time point. Similarly, the execution device 21 calculates the absolute value of the difference between the values indicating the positions on the X-axis of the position coordinates PC corresponding to the head A at the second time point and the third time point as the absolute value of the variation amount per unit time at the second time point and the third time point. Further, the execution device 21 calculates the absolute value of the difference between the values indicating the positions on the X-axis of the position coordinates PC corresponding to the head A at the (N−1)-th time point and the N-th time point as the absolute value of the variation amount per unit time at the (N−1)-th time point and the N-th time point. Then, the execution device 21 calculates the average value of the absolute values of the calculated variation amounts per unit time as the worker speed SW. For example, it is assumed that the position coordinates PC corresponding to the head A has not been acquired at the N-th time point. In this case, the absolute value of the variation amount per unit time from the (N−2)-th time point to the (N−1)-th time point and the absolute value of the variation amount per unit time from the (N−1)-th time point to the N-th time point cannot be calculated. Therefore, in the above case, the absolute value of the variation amount per unit time from the (N−2)-th time point to the (N−1)-th time point and the absolute value of the variation amount per unit time from the (N−1)-th time point to the N-th time point are not used to calculate the above average value. As a result, for example, the worker speed SW of a worker who is walking tends to be higher than the worker speed SW of a worker who is working at a certain location. The execution device 21 calculates the worker speed SW of each worker. After step S22, the execution device 21 proceeds to step S23.

In step S23, the execution device 21 calculates a cumulative period PA based on the time series of the position coordinates PC. Specifically, the execution device 21 calculates, as the cumulative period PA, a cumulative value of a period in which the value indicating the position on the X-axis of the position coordinates PC corresponding to the right shoulder B is smaller than the value indicating the position on the X-axis of the position coordinates PC corresponding to the left shoulder F in the specific period PR. Therefore, as shown in FIG. 3, the cumulative period PA increases as the body of the worker faces the camera 40 for a longer time. In the present embodiment, the cumulative period PA is a value indicating a positional relationship of the position coordinates PC corresponding to the right shoulder B and the position coordinates PC corresponding to the left shoulder F. After step S23, the execution device 21 proceeds to step S24 as shown in FIG. 2.

As shown in FIG. 2, in step S24, the execution device 21 identified a worker subject to behavior recognition based on the position coordinates PC of each worker. For example, it is assumed that the execution device 21 obtains the skeleton information IS of more than one worker in step S12. In this case, the execution device 21 extracts workers except for a worker whose worker speed SW is higher than a predetermined specific worker speed SWA among the plurality of workers. The specific worker speed SWA is a predetermined threshold value for excluding a worker who is on the move by walking or the like. The specific worker speed SWA can be determined through experiments and simulations. Further, the execution device 21 identifies a worker having the longest cumulative period PA among the extracted workers as a worker subject to behavior recognition. In other words, the execution device 21 identifies the worker whose body faces the camera 40 for the longest time among the plurality of workers except for the worker who is on the move, as the worker whose behavior is to be recognized. After step S24, the execution device 21 proceeds to step S31.

In step S31, the execution device 21 calculates a right-hand speed SSD, which is the moving speed of the right hand D, based on the position coordinates C corresponding to the right hand D included in the skeleton information IS of the worker identified in step S24. It is assumed that a total of N sets of data exist as the time series of the skeleton information IS of the specified worker. The "N" is an integer greater than or equal to two. Also, the N data sets are referred to as the data at the first time point, the data at the second time point, . . . , and the data at the N-th time point in order from the oldest data. In this case, the execution device 21 calculates the right-hand speed SSD, for example, as follows. The execution device 21 sets the Euclidean distance between the position coordinates PC corresponding to the right hand D at the first time point and the position coordinates PC corresponding to the right hand D at the second time point as the right-hand speed SSD at the second time point. Similarly, the execution device 21 sets the Euclidean distance between the position coordinates PC corresponding to the right hand D at the second time point and the position coordinates PC corresponding to the right hand D at the third time point as the right-hand speed SSD at the third time point. In the same manner as described above, the execution device 21 calculates the right-hand speed SSD up to the N-th time point.

Further, the execution device 21 calculates a left-hand speed SSH, which is the moving speed of the left hand H, based on the position coordinates PC corresponding to the left hand H included in the skeleton information IS of the worker identified in step S24. For example, the execution device 21 sets the Euclidean distance between the position coordinates PC corresponding to the left hand H at the first time point and the position coordinates PC corresponding to the left hand H at the second time point as the left-hand speed SSH at the second time point. Similarly, the Euclidean distance between the position coordinates PC corresponding to the left hand H at the second time point and the position coordinates PC corresponding to the left hand H at the third time point is set as the left-hand speed SSH at the third time point. In the same manner as described above, the execution device 21 calculates the left-hand speed SSH up to the N-th time point. In the present embodiment, each of the right-hand speed SSD and the left-hand speed SSH corresponds to a specified part speed which is a moving speed of a specified part. After step S31, the execution device 21 proceeds to step S32.

In step S32, the execution device 21 determines right-hand noise data DND based on the right-hand speed SSD calculated in step S31. Specifically, the execution device 21 extracts the right-hand speed SSD that is higher than a predetermined specific right-hand speed among the right-hand speeds SSD from the second time point to the N-th time point. Then, the execution device 21 determines the position coordinates PC corresponding to the extracted right-hand speed SSD as the right-hand noise data DND. For example, when the extracted right-hand speed SSD is the right-hand speed SSD at the N-th time point, the execution device 21 determines the position coordinates PC corresponding to the right hand D at the N-th time point as the right-hand noise data DND. In other words, the right-hand noise data DND is the position coordinates PC corresponding to the right-hand speed SSD that is higher than the predetermined specific right-hand speed in the time series of the position coordinates PC corresponding to the right hand D. The specific right-hand speed is a threshold value for extracting the right-hand speed SSD that exceeds the assumption in the work process performed by the worker.

The execution device 21 also determines left-hand noise data DNH based on the left-hand speed SSH calculated in step S31. Specifically, the execution device 21 extracts the left-hand speed SSH that is higher than a predetermined specific left-hand speed among the left-hand speeds SSH from the second time point to the N-th time point. Then, the execution device 21 determines the position coordinates PC corresponding to the extracted left-hand speed SSH as the left-hand noise data DNH. For example, when the extracted left-hand speed SSH is the left-hand speed SSH at the N-th time point, the execution device 21 determines the position coordinates PC corresponding to the left hand H at the N-th time point as the left-hand noise data DNH. In other words, the left-hand noise data DNH is the position coordinates PC corresponding to the left-hand speed SSH that is higher than the predetermined specific left-hand speed in the time series of the position coordinates PC corresponding to the left hand H. The specific left-hand speed is a threshold value for extracting the left-hand speed SSH that exceeds the assumption in the work process performed by the worker. In the present embodiment, each of the right-hand noise data DND and the left-hand noise data DNH corresponds to noise data. Each of the specific right-hand speed and the specific left-hand speed corresponds to a specific part speed. After step S32, the execution device 21 proceeds to step S33.

In step S33, the execution device 21 generates right-hand substitute data DAD based on the position coordinates PC corresponding to the right hand D. For example, the right-hand noise data DND determined in step S32 is the position coordinates PC corresponding to the right hand D at the N-th time point. In this case, the execution device 21 generates the average value of the position coordinates PC corresponding to the right hand D at the (N−1)-th time point and the position coordinates PC corresponding to the right hand D at the (N−2)-th time point as the right-hand substitute data DAD at the N-th time point. Therefore, the right-hand substitute data DAD corresponds to the position coordinates PC corresponding to the right hand D of which the right-hand speed SSD is less than or equal to the predetermined specific right-hand speed. For example, when the right-hand noise data DND determined in step S32 is the position coordinates PC corresponding to the right hand D at the second time point, the execution device 21 generates the same position coordinates PC corresponding to the right hand D at the first time point as the right-hand substitute data DAD at the second time point.

Further, the execution device 21 generates left-hand substitute data DAH based on the position coordinates PC corresponding to the left hand H. For example, the left-hand noise data DNH determined in step S32 is the position coordinates PC corresponding to the left hand H at the N-th time point. In this case, the execution device 21 generates the average value of the position coordinates PC corresponding to the left hand H at the (N−1)-th time point and the position coordinates PC corresponding to the left hand H at the (N−2)-th time point as the left-hand substitute data DAH at the N-th time point. Therefore, the left-hand substitute data DAH corresponds to the position coordinates PC corresponding to the left hand H of which the left-hand speed SSH is less than or equal to the predetermined specific left-hand speed. For example, when the left-hand noise data DNH determined in step S32 is the position coordinates PC corresponding to the left hand H at the second time point, the execution device 21 generates the same position coordinates PC corresponding to the left hand H at the first time point as the left-hand substitute data DAH at the second time point. In the present embodiment, each of the right-hand substitute data DAD and the left-hand substitute data DAH corresponds to the substitute data. After step S33, the execution device 21 proceeds to step S34.

In step S34, the execution device 21 generates recognition subject information IR based on the skeleton information IS, the right-hand substitute data DAD, and the left-hand substitute data DAH of the worker identified in step S24. Specifically, the execution device 21 generates information by removing the right-hand noise data DND from the skeleton information IS of the worker identified in step S24, and then adding the right-hand substitute data DAD in place of the right-hand noise data DND. Further, the execution device 21 generates, as the recognition subject information IR, information obtained by removing the left-hand noise data DNH from the information, to which the right-hand substitute data DAD has been added, and then adding the left-hand substitute data DAH in place of the left-hand noise data DNH. After step S34, the execution device 21 proceeds to step S41.

In step S41, the execution device 21 generates the recognition subject information IR as an input variable to the mapping described in the mapping data 22B. It is assumed that a total of N sets of data exist as the time series of the skeleton information IS included in the recognition subject information IR. The "N" is an integer greater than or equal to two. Also, the N data sets are referred to as the data at the first time point, the data at the second time point, . . . , and the data at the N-th time point in order from the oldest data. As described above, the skeleton information IS included in the recognition subject information IR includes a total of nine parts. The position coordinates PC corresponding to a part include a value indicating a position on the X-axis and a value indicating a position on the Y-axis. Therefore, each skeleton information IS includes a total of eighteen types of numerical values. In step S41, the execution device 21 sequentially substitutes the eighteen types of numerical values included in the skeleton information IS at the first time point for input variable x(1) to input variable x(18) one by one. Similarly, the execution device 21 sequentially substitutes eighteen types of numerical values included in the skeleton information IS at the second time point for input variable x(19) to input variable x(36) one by one. By generating the input variables in the same manner as described above, the execution device 21 generates input variables x(1) to x(18×N). Hereinafter, the number of types of input variables generated in step S41 is denoted by "Z". After step S41, the execution device 21 proceeds to step S42.

In step S42, the execution device 21 calculates the value of output variable y(i) by inputting input variables x(1) to x(Z) and input variable x(0) as a bias parameter to the mapping described in the mapping data 22B.

An example of the mapping described in the mapping data 22B is a function approximator, which is a fully-connected forward-propagation neural network with one intermediate layer. Specifically, in the mapping, each of "m" values obtained by converting the input variables x(1) to x(Z) and the input variable x(0) as the bias parameter by linear mapping defined by the coefficients wFjk (j=1 to m, k=0 to Z) is substituted into the activation function f. As a result, the value of the node of the intermediate layer is determined. In addition, each of the values obtained by converting the values of the nodes of the intermediate layer by the linear mapping defined by the coefficients wSij (i=1 to P) is substituted into the activation function g, thereby determining output variable y(1) to output variable y(P). The number of types of the output variables in step S42 is denoted by "P". The "P", which is the number of types of output variables, is the same as the number of types of work processes performed by the worker. That is, for example, in a case where there are first to tenth work processes performed by the worker, "P" is "10". In the present embodiment, an example of the activation function f is a ReLU function. An example of the activation function g is a softmax function. Therefore, the output variables y(1) to y(P) indicate the probability that the corresponding work processes are being performed.

The mapping described in the mapping data 22B is learned in advance as follows, for example. For example, the work processes performed by the worker are the first process to the tenth process. In this case, first, in learning for recognizing the first process, the input variables x(1) to x(Z) are generated in the same manner as described above while having the worker perform the first work process in a correct procedure. In this case, the generated input variables x(1) to x(Z) are used as data used for learning. Further, the first process is set as a correct label. That is, the value of the output variable y(1) is set to "1", and the values of the output variables y(2) to y(P) are set to "0". By inputting such data to the mapping, the mapping is learned by machine learning. Similarly, in learning for recognizing the second process, the input variables x(1) to x(Z) are generated in the same manner as described above while having the worker perform the second work process in a correct procedure. In this case, the generated input variables x(1) to x(Z) are used as data used for learning. Further, the second process is set as a correct label. That is, the value of the output variable y(2) is set to "1", and the values of the output variable y(1) and the output variables y(3) to y(P) are set to "0". By inputting such data to the mapping, the mapping is learned by machine learning. In the same manner as described above, mapping is learned by machine learning for the third to tenth processes. After step S42, the execution device 21 proceeds to step S43.

In step S43, the execution device 21 identifies the work process performed by the worker subject to the behavior recognition based on the output variables y(1) to y(P). Specifically, the execution device 21 determines the maximum value among the output variable y(1) to the output variable y(P). Then, the execution device 21 identifies the work process corresponding to the maximum value as the work process performed by the worker. For example, when the output variable y(1) is the maximum value, the execution device 21 identifies the first process as the work process performed by the worker. The execution device 21 stores the identified work process in the memory device 22. In the present embodiment, the process of step S43 is a process for recognizing the behavior of a worker who is the subject of behavior recognition. As described above, since the input variables for the mapping described in the mapping data 22B are based on the time series of the skeleton information IS included in the recognition subject information IR, the execution device 21 recognizes the behavior of the worker subject to behavior recognition based on the time series of the skeleton information IS. After step S43, the execution device 21 proceeds to step S51.

In step S51, the execution device 21 determines whether a predetermined normal condition is satisfied. In the present embodiment, the normal condition is satisfied when one of the following requirements (1) and (2) is satisfied.

Requirement (1): The work process identified in the current recognition control is the same as the work process identified in the previous recognition control.

Requirement (2): The work process identified in the current recognition control is the next work process of the work process identified in the previous recognition control.

In step S51, when the execution device 21 determines that the normal condition is satisfied (S51: YES), the execution device 21 proceeds to step S61. In step S61, the execution device 21 determines that the work process of the worker is correct. After step S61, the execution device 21 ends the current recognition control. Then, the execution device 21 proceeds to step S11 again.

When the execution device 21 determines that the normal condition is not satisfied in step S51 (S51: NO), the execution device 21 proceeds to step S71. For example, when the work process identified in the previous recognition control is the first process and the work process identified in the current recognition control is the third process, the execution device 21 determines that the normal condition is not satisfied.

In step S71, the execution device 21 determines that the work process of the worker is incorrect. After step S71, the execution device 21 proceeds to step S72. In step S72, the execution device 21 outputs a control signal to the display 50 to show information indicating that the work process of the worker is incorrect on the display 50. After step S72, the execution device 21 ends the current recognition control. Then, the execution device 21 proceeds to step S11 again.

Operation of the Present Embodiment

As shown in FIG. 2, in step S12, the execution device 21 obtains, from the video data DP for the specific period PR, the skeleton information IS of a worker included in the video data DP. Further, in step S21, the execution device 21 obtains the position coordinates PC of a part included in each skeleton information IS. In step S22, the execution device 21 calculates the worker speed SW, which is the moving speed of the worker that corresponds to the position coordinates PC, based on the time series of the position coordinates PC. Further, in step S23, the execution device 21 calculates the cumulative period PA that indicates the positional relationship between the position coordinates PC corresponding to the right shoulder B and the position coordinates PC corresponding to the left shoulder F based on the time series of the position coordinates PC. Then, in step S24, the execution device 21 identifies a worker subject to behavior recognition based on the position coordinates PC of each worker, specifically, based on the worker speed SW and the cumulative period PA.

Advantages of the Present Embodiment (1) Even when the execution device 21 obtains the skeleton information IS of more than one worker in step S12, the worker speed SW and the cumulative period PA of each worker will vary depending on whether the worker is the subject of behavior recognition. Thus, the worker subject to behavior recognition is identifiable in step S24 based on the time series of the position coordinates PC included in the skeleton information IS of each worker. In this manner, the work process performed by the worker, who is subject to behavior recognition, is appropriately recognized in step S41 to step S43. In other words, the behavior of a worker who is excluded from the behavior recognition subject will not affect behavior recognition of the subject worker.

(2) In step S12, the execution device 21 may obtain, for example, the skeleton information IS of a worker who is on the move by walking or the like near the subject worker, in addition to the skeleton information IS of the subject worker who is working at a certain location. In this case, the worker speed SW of the worker who is on the move will be higher than the worker speed SW of the worker who is working at a certain location without moving the location.

In this respect, in step S24, the execution device 21 excludes the worker whose worker speed SW is higher than the predetermined specific worker speed SWA among more than one worker, and then identifies the worker subject to behavior recognition. In this manner, when the worker on the move is excluded, the worker who is subject to behavior recognition is further accurately identifiable.

(3) When the positional relationship between the worker subject to the behavior recognition and the camera 40 for capturing the video data DP of the worker does not change, it is highly likely that the orientation of the body of the subject worker remains substantially the same in the video data DP.

In this respect, in step S23, the execution device 21 calculates the cumulative period PA based on the time series of the position coordinates PC. The cumulative period PA is a cumulative value of a period in which the value indicating the position on the X-axis of the position coordinates PC corresponding to the right shoulder B is smaller than the value indicating the position on the X-axis of the position coordinates PC corresponding to the left shoulder F in the specific period PR. Then, in step S24, the execution device 21 identifies a worker having the longest cumulative period PA among more than one worker as the worker subject to behavior recognition. In this manner, the worker whose body is oriented in substantially the same direction in the video data DP, or the worker subject to behavior recognition, is further accurately identifiable based on the positional relationship between the position coordinates PC corresponding to the right shoulder B and the position coordinates PC corresponding to the left shoulder F.

(4) The worker subject to behavior recognition may perform an unnecessary activity such as touching the head A with the right hand D. If the work process performed by the worker is recognized in steps S41 to S43 based on the skeleton information IS including unnecessary activities such as described above, the work process may not be correctly recognized.

In this respect, in step S32, the execution device 21 identifies, as the right-hand noise data DND, the position coordinates PC corresponding to the right-hand speed SSD that is higher than the predetermined specific right-hand speed among the time series of the position coordinates PC corresponding to the right hand D. Further, in step S34, the execution device 21 generates the recognition subject information IR by removing the right-hand noise data DND from the skeleton information IS of the worker identified in step S24. Then, in steps S41 to S43, the execution device 21 recognizes the work process performed by the worker based on the recognition subject information IR. In this manner, the work process performed by the worker is more appropriately recognized by excluding the unnecessary activities of the worker subject to the behavior recognition.

(5) In step S33, the execution device 21 generates the right-hand substitute data DAD based on the position coordinates PC corresponding to the right hand D. The right-hand substitute data DAD includes the position coordinates PC corresponding to the right hand D of which the right-hand speed SSD is less than or equal to the predetermined specific right-hand speed. Then, in step S34, the execution device 21 generates the recognition subject information IR using information obtained by removing the right-hand noise data DND from the skeleton information IS of the worker identified in step S24 and then adding the right-hand substitute data DAD in place of the right-hand noise data DND. This avoids a situation in which the work process performed by the worker becomes unrecognizable due to the removal of the right-hand noise data DND.

MODIFIED EXAMPLES

The present embodiment may be modified as described below. The present embodiment and the following modifications can be combined as long as the combined modifications remain technically consistent with each other.

In the above embodiment, the recognition control may be changed.

For example, in step S21, the part of the worker from which the position coordinates PC are acquired may be changed. In a specific example, the execution device 21 may acquire the position coordinates PC of other parts of the worker, instead of or in addition to the head A, the right shoulder B, the right elbow C, the right hand D, the right hip E, the left shoulder F, the left elbow G, the left hand H, and the left hip I, from the skeleton information IS. In addition, in a specific example, the execution device 21 may acquire the position coordinates PC of eight or less parts or ten or more parts from the skeleton information IS instead of a total of nine parts.

For example, in step S22, the worker speed SW may be calculated in a different manner. In a specific example, instead of or in addition to the position coordinates PC corresponding to the head A, the execution device 21 may calculate the worker speed SW based on the absolute value of the variation amount per unit time of the value indicating the position on the X-axis of the position coordinates PC corresponding to the right hip E.

For example, in step S23, the cumulative period PA may be calculated in a different manner. In a specific example, the camera 40 is positioned at a place where the camera 40 can capture the state of a worker subject to the behavior recognition from the back of the worker. In this case, the execution device 21 may calculate, as the cumulative period PA, a cumulative value of a period in which the value indicating the position on the X-axis of the position coordinates PC corresponding to the right shoulder B is greater than the value indicating the position on the X-axis of the position coordinates PC corresponding to the left shoulder F in the specific period PR.

For example, in step S24, a worker subject to behavior recognition may be identified in a different manner. In a specific example, regardless of the worker speed SW, the execution device 21 may identify a worker having the longest cumulative period PA among a plurality of workers as a worker subject to behavior recognition. In this case, the process of step S22 can be omitted.

Further, in a specific example, regardless of the cumulative period PA, the execution device 21 may identify the worker having the lowest worker speed SW among the plurality of workers as the worker subject to the behavior recognition. In this case, the process of step S23 can be omitted.

For example, in step S31, the execution device 21 may calculate the speed of another part as the specified part speed in addition to or instead of the right-hand speed SSD and the left-hand speed SSH. In a specific example, the execution device 21 may calculate a right-elbow speed, which is the moving speed of the right elbow C, based on the position coordinates PC corresponding to the right elbow C included in the skeleton information IS of the worker identified in step S24. In this case, in step S32, the execution device 21 may determine the noise data based on the right-elbow speed calculated in step S31. That is, the noise data determined in step S32 may be changed in accordance with the specified part speed calculated in step S31. Similarly, the substitute data generated in step S33 may be changed in accordance with the specified part speed calculated in step S31.

For example, in step S34, the recognition subject information IR may be generated in a different manner. In a specific example, the execution device 21 may generate the recognition subject information IR without adding the right-hand substitute data DAD while excluding the right-hand noise data DND from the skeleton information IS of the worker identified in step S24. In this case, for example, when the right-hand noise data DND at the N-th time point is excluded from the skeleton information IS at the N-th time point, the execution device 21 may generate, as the recognition subject information IR, information from the skeleton information IS at the first time point to the skeleton information IS at the (N−1)-th time point. That is, the execution device 21 does not necessarily have to add the right-hand substitute data DAD. Similarly, the execution device 21 does not necessarily have to add the left-hand substitute data DAH. In this case, the process of step S33 can be omitted.

In a specific example, the execution device 21 may generate the skeleton information IS of the worker identified in step S24 as the recognition subject information IR. That is, the execution device 21 does not necessarily have to remove the right-hand noise data DND. Similarly, the execution device 21 does not necessarily have to remove the left-hand noise data DNH. In this case, the process of step S32 can be omitted.

For example, in step S72, the notification may be issued in a different manner. In a specific example, instead of or in addition to the notification shown on the display 50, the execution device 21 may issue a notification by generating a sound by a speaker, for example.

In the above embodiment, the configuration of the behavior recognition system 10 may be changed.

For example, the activation function of the mapping described in the mapping data 22B is an example, and the activation function of the mapping may be changed.

For example, as the mapping described in the mapping data 22B, a neural network having one intermediate layer has been exemplified, but the number of intermediate layers may be two or more.

For example, as the mapping neural network described in the mapping data 22B, the fully-connected forward-propagation neural network is exemplified, but the present invention is not limited thereto. As a specific example, the neural network may be a recurrent connection type neural network.

Further, for example, the function approximator as the mapping is not limited to the neural network. As a specific example, the mapping may be a regression equation without an intermediate layer.

For example, the computer 20 may be changed. As a specific example, the computer 20 is not limited to a computer that executes software processing by a CPU. For example, a dedicated hardware circuit such as an application specific integrated circuit (ASIC) that executes at least part of software processing executed in the above-described embodiment may be provided. That is, the computer 20 may have any one of the following configurations. (a) A configuration including a processor that executes all of the above-described processes according to programs and a program storage device such as a ROM that stores the programs. (b) A configuration including a program storage device and a processor that executes part of the above-described processes according to programs and a dedicated hardware circuit that executes the remaining processes. (c) A configuration including a dedicated hardware circuit that executes all of the above-described processes. There may be more than one software execution device and more than one dedicated hardware circuit including a processor and a program storage device.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for recognizing behavior used in control executed by a computer, the method comprising:

obtaining a time series of skeleton information of a worker from video data;

obtaining position coordinates of each part of the worker included in the obtained skeleton information;

identifying, when the skeleton information of more than one worker is obtained, a worker who is subject to behavior recognition based on the position coordinates of each of the more than one worker;

recognizing behavior of the identified worker based on the time series of the skeleton information of the identified worker;

calculating a specified part speed based on the time series of the skeleton information of the identified worker, the specified part speed corresponding to a moving speed of a predetermined specified part included in the skeleton information;

generating recognition subject information obtained by removing noise data from the time series of the skeleton information of the identified worker, the noise data including the position coordinates of the specified part of which the calculated specified part speed is higher than a predetermined specific part speed among the time series of the position coordinates of the specified part; and recognizing behavior of the identified worker based on the recognition subject information of the identified worker.

2. The method according to claim 1, further comprising:

calculating, when the skeleton information of more than one worker is obtained, a worker speed for each of the more than one worker based on the time series of the position coordinates of the each of the more than one worker, the worker speed corresponding to a moving speed of a worker; and identifying a worker who is subject to behavior recognition after excluding any of the more than one worker of which the calculated worker speed is higher than a predetermined specific worker speed.

3. The method according to claim 1, further comprising:

identifying, when the skeleton information of more than one worker is obtained, a worker who is subject to behavior recognition based on a positional relationship between the position coordinates of a right shoulder included in the obtained skeleton information and the position coordinates of a left shoulder included in the obtained skeleton information.

4. The method according to claim 1, further comprising:

generating, as substitute data, the position coordinates of the specified part of which the calculated specified part speed is less than or equal to the predetermined specific part speed; and generating, as the recognition subject information, information obtained by excluding the noise data and then adding the substitute data in place of the noise data.

* * * * *